INVENTORS:
WALTER GEFFCKEN, MARGA FAULSTICH

United States Patent Office 3,009,819
Patented Nov. 21, 1961

3,009,819
OPTICAL GLASS
Walter Geffcken and Marga Faulstich, Mainz, Germany, assignors to Jenaer Glaswerk Schott & Gen., Mainz, Germany, a corporation of Germany
Filed Feb. 19, 1958, Ser. No. 716,077
Claims priority, application Germany Feb. 20, 1957
11 Claims. (Cl. 106—47)

The present invention relates to a glass which has a very high refractive index $nd$ and also a high Abbe value $\nu$, and which is intended for optical purposes, and particularly for optical systems of the highest possible power.

A glass of this kind with a refractive index of more than 1.64 has already been produced prior to this invention by the introduction of larger components of $La_2O_3$ and $ThO_2$. The highest possible Abbe value which could be attained in such a glass amounted to about 58.5. Although such a glass is quite valuable for some purposes, there is still a great need for a glass with a still higher Abbe value at a refractive index between 1.59 and 1.64. The best possible glass of this kind which is presently available in commerce has a refractive index of 1.6204 at an Abbe value of 60.2 and a content of silicic acid of about 30%. It has also been found that the refractive index of such a glass can be varied between the values of 1.59 and 1.65, on the one hand, by an addition of boric acid and, on the other hand, by a replacement of BaO by means of $La_2O_3$ or $ThO_2$. However, it has been further found that the Abbe value of such a glass when thus modified does not as yet comply with the requirements of optical systems of the highest power.

Figure 1:
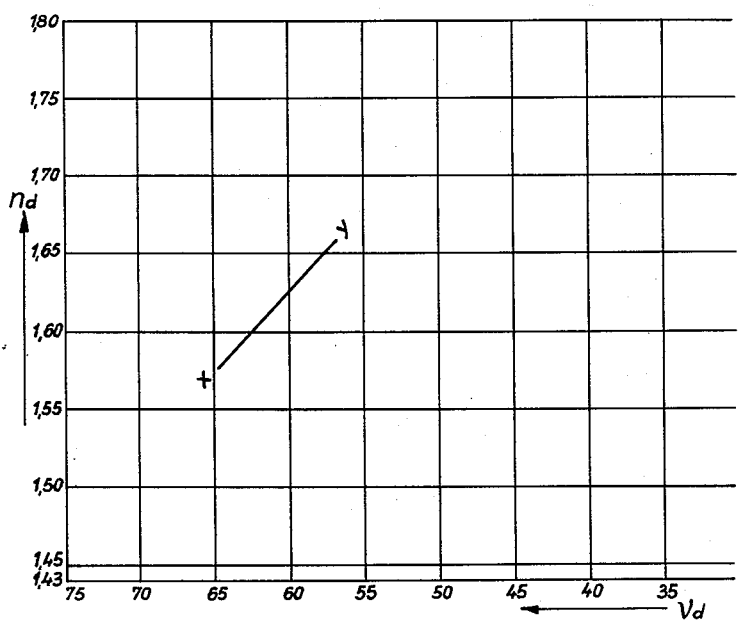

In the accompanying drawings, FIG. 1 shows a graph which illustrates that the best possible $\nu$-values of the known kinds of glass, although usually smaller, fall within a line X—Y. This line corresponds to the equation $\nu$ max$=62.2-(nd-1.60).100$, wherein "$\nu$ max" means the highest possible Abbe value attainable in a glass of this kind.

It is an object of the present invention to provide a glass for optical purposes with an Abbe value greater than $62.2-(nd-1.60).100$ and disposed at the left of line X—Y in the graph according to FIG. 1.

Although glass of this type has also been produced prior to this invention the known kinds not only had a high content in expensive rare earths but they also contained considerable amounts of fluorine. Because of the high volatility of this substance, it was extremely difficult to produce larger pieces of such glass which were free of any cords as required for optical purposes.

It is therefore another object of the present invention to provide a glass of the type as above described which may be melted without any difficulties and will be free of any cords. For attaining these objects, the glass according to the present invention consists essentially of boric acid and earth alkalies.

Although it has been known for some time that such systems have a glass range of a considerable extent, it was so far unknown and has now been found that within these ranges there are smaller zones in which the Abbe value rises considerably above the maximum stated in the above equation.

Figure 2:
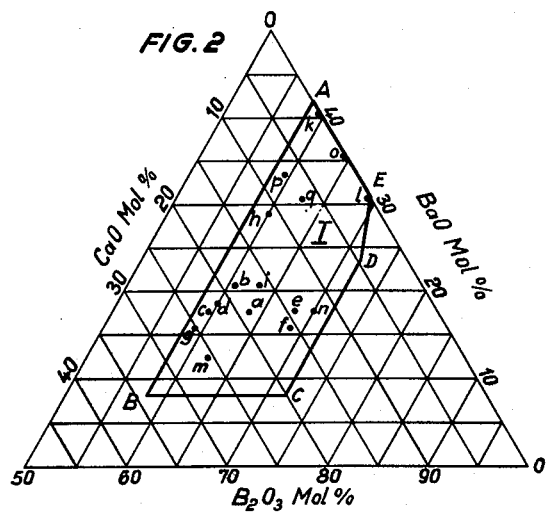

The optical glass according to the present invention consists of the system BaO, CaO, and $B_2O_3$ in a composition ratio in mol-percent, the range of which within a triangular coordinate system is defined by a straight-lined connection between the values A, B, C, D, and E, as indicated in FIG. 2, in which A is $B_2O_3=58$, BaO$=42$;
B is $B_2O_3=58$, BaO$=8$, CaO$=34$;
C is $B_2O_3=72$, BaO$=8$, CaO$=20$;
D is $B_2O_3=72$, BaO$=23$, CaO$=5$; and
E is $B_2O_3=69$, BaO$=31$.

If the optical glass according to the invention is defined in terms of weight-percent rather than in mol-percent, as above set forth, the following is observed:

A. $B_2O_3=47.73$, BaO$=52.73$
B. $B_2O_3=59.49$, BaO$=12.41$, CaO$=28.09$
C. $B_2O_3=71.84$, BaO$=12.08$, CaO$=16.08$
D. $B_2O_3=64.97$, BaO$=31.40$, CaO$=3.63$, and
E. $B_2O_3=59.94$, BaO$=40.46$.

Specific examples of different kinds of glass of a composition ratio according to the invention are indicated below in Table 1 under section II, namely, from IIa to IIq, while the respective optical values of the different kinds of glass are indicated in Table 2 under section II which also shows in the last column thereof the increase in $\nu$ over the values as indicated by the line X—Y in FIG. 1. Table 2 also shows that the Abbe values may range as high as 3.4.

TABLE 1

| | No. | $B_2O_3$ | | CaO | | BaO | | SrO | |
|---|---|---|---|---|---|---|---|---|---|
| | | mol-percent | wt.-percent | mol-percent | wt.-percent | mol-percent | wt.-percent | mol-percent | wt.-percent |
| I | A | 64.8 | 59.05 | 10.9 | 8.00 | | | 24.3 | 32.95 |
| | B | 64.1 | 56.16 | 4.3 | 3.03 | | | 31.3 | 40.81 |
| | C | 61.2 | 54.07 | 8.4 | 5.98 | | | 30.4 | 39.96 |
| | D | 64.2 | 61.11 | 18.2 | 13.96 | | | 17.6 | 24.93 |
| | E | 65.1 | 60.77 | 14.5 | 10.90 | | | 20.4 | 28.33 |
| | F | 66.3 | 66.08 | 23.6 | 18.94 | | | 10.1 | 14.98 |
| | G | 71.7 | 66.12 | 8.1 | 6.01 | | | 20.3 | 27.86 |
| | H | 74.5 | 71.84 | 12.8 | 9.94 | | | 12.7 | 18.22 |
| | I | 64.2 | 54.65 | | | | | 35.8 | 45.35 |
| | K | 68.3 | 59.15 | | | | | 31.7 | 40.85 |
| | L | 67.0 | 68.19 | 6.9 | 21.38 | | | 26.1 | 10.44 |
| | M | 64.8 | 62.76 | 20.4 | 15.91 | | | 14.8 | 21.33 |
| II | A | 63.6 | 54.19 | 18.9 | 12.97 | 17.5 | 32.84 | | |
| | B | 60.4 | 50.12 | 19.4 | 12.96 | 20.2 | 36.92 | | |
| | C | 59.5 | 51.12 | 23.1 | 15.97 | 17.4 | 32.91 | | |
| | D | 60.0 | 50.60 | 21.3 | 14.48 | 18.8 | 34.92 | | |
| | E | 67.7 | 57.13 | 14.7 | 9.98 | 17.7 | 32.89 | | |
| | F | 68.5 | 59.15 | 15.8 | 10.99 | 15.7 | 29.86 | | |
| | G | 59.2 | 52.16 | 25.3 | 17.95 | 15.4 | 29.88 | | |
| | H | 60.0 | 45.26 | 11.1 | 6.74 | 28.9 | 48.01 | | |
| | I | 63.2 | 52.15 | 16.5 | 10.96 | 20.3 | 36.89 | | |
| | K | 59.6 | 40.12 | | | 40.4 | 59.88 | | |
| | L | 69.0 | 50.27 | | | 31.0 | 49.73 | | |
| | M | 62.0 | 56.35 | 25.5 | 18.63 | 12.5 | 25.02 | | |
| | N | 70.0 | 58.74 | 12.1 | 8.18 | 17.9 | 33.08 | | |
| | O | 64.5 | 45.21 | | | 35.5 | 54.79 | | |
| | P | 59.8 | 43.03 | 6.7 | 3.88 | 33.5 | 53.09 | | |
| | Q | 62.5 | 46.05 | 6.7 | 3.98 | 30.8 | 49.98 | | |

TABLE 1—Continued

| No. | | B₂O₃ | | CaO | | BaO | | SiO₂ | | P₂O₅ | | F₂ in place of O, wt.-per-cent | BeO, wt.-per-cent | Li₂O, wt.-per-cent | La₂O₃, wt.-per-cent |
|---|---|---|---|---|---|---|---|---|---|---|---|---|---|---|---|
| | | mol-per-cent | wt.-per-cent | mol-per-cent | wt.-per-cent | mol-per-cent | wt.-per-cent | mol-per-cent | wt.-per-cent | mol-per-cent | wt.-per-cent | | | | |
| III | A | 59.9 | 51.15 | 14.5 | 9.97 | 17.5 | 32.91 | 8.1 | 5.97 | | | | | | |
| | B | 57.5 | 51.16 | 19.5 | 13.98 | 16.8 | 32.91 | | | | | | 2.0 | | |
| | C | 58.5 | 50.87 | 21.7 | 15.20 | 17.2 | 32.94 | | | | | | | 1.0 | |
| | D | 60.6 | 50.17 | 19.5 | 13.01 | 18.6 | 33.91 | | | | | | | | 3.0 |
| | E | 58.7 | 49.40 | 21.8 | 14.78 | 17.2 | 31.88 | | | 3.94 | 2.3 | | | | |
| | F | 65.2 | 50.77 | 11.3 | 7.09 | 21.8 | 37.38 | | | | | | | | 5.0 |
| | G | 59.4 | 50.42 | 22.05 | 15.08 | 17.4 | 32.52 | | | 1.99 | 1.15 | | | | |
| | H | 61.6 | | 19.9 | | 18.3 | | | | | | 1.7 | | | |

TABLE 2

*Optical data*

| | No. | $n_d$ | $\nu$ | $\nu$ Increase |
|---|---|---|---|---|
| I | A | 1.6083 | 63.7 | 2.3 |
| | B | 1.6117 | 63.6 | 2.5 |
| | C | 1.6183 | 63.0 | 2.6 |
| | D | 1.6076 | 63.6 | 2.2 |
| | E | 1.6003 | 63.5 | 1.3 |
| | F | 1.6010 | 63.6 | 1.5 |
| | G | 1.6012 | 62.6 | 1.5 |
| | H | 1.5966 | 63.9 | 1.4 |
| | I | 1.6146 | 63.1 | 2.4 |
| | K | 1.6022 | 63.6 | 1.6 |
| | L | 1.6039 | 63.6 | 1.8 |
| | M | 1.6060 | 63.3 | 1.7 |
| II | A | 1.6181 | 61.8 | 1.4 |
| | B | 1.6317 | 61.0 | 2.0 |
| | C | 1.6263 | 61.3 | 1.7 |
| | D | 1.6276 | 60.9 | 1.5 |
| | E | 1.6056 | 62.9 | 1.2 |
| | F | 1.6039 | 62.5 | 0.7 |
| | G | 1.6275 | 61.1 | 1.7 |
| | H | 1.6371 | 60.6 | 2.1 |
| | I | 1.6204 | 62.1 | 1.9 |
| | K | 1.6446 | 61.2 | 3.4 |
| | L | 1.6073 | 62.1 | 0.6 |
| | M | 1.6225 | 61.0 | 1.1 |
| | N | 1.6026 | 62.1 | 0.2 |
| | O | 1.6207 | 61.7 | 2.4 |
| | P | 1.6375 | 60.3 | 1.9 |
| | Q | 1.6307 | 61.4 | 2.3 |
| III | A | 1.6121 | 62.4 | 1.4 |
| | B | 1.6205 | 62.8 | 2.7 |
| | C | 1.6289 | 62.0 | 2.7 |
| | D | 1.6316 | 60.5 | 1.5 |
| | E | 1.6252 | 61.9 | 2.2 |
| | F | | | |
| | G | 1.61483 | 62.7 | 2.0 |
| | H | 1.6146 | 62.8 | 2.1 |

Figure 3:
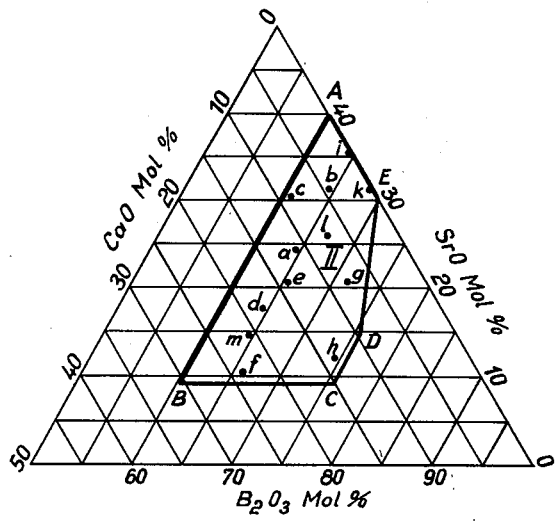

Other kinds of glass according to the invention consist of the system SrO, CaO, and B₂O₃ in a composition ratio in mol percent, the range of which within a triangular coordinate system is defined by a straight-lined connection between the values A, B, C, D, and E, as indicated in FIG. 3, wherein A is B₂O₃=60, SrO=40;
B is B₂O₃=60, SrO=9, CaO=31;
C is B₂O₃=76, SrO=9, CaO=15;
D is B₂O₃=76, SrO=15, CaO=9; and
E is B₂O₃=70, SrO=30.

The above optical glass compositions as defined in weight-percent are shown below:

A is B₂O₃=50.20, SrO=49.80
B is B₂O₃=61.00, SrO=13.62, CaO=25.38
C is B₂O₃=74.90, SrO=13.20, CaO=11.90
D is B₂O₃=71.74, SrO=21.42, CaO=6.80, and
E is B₂O₃=60.65, SrO=39.35.

Specific examples of different kinds of glass of this composition ratio according to FIG. 3 are indicated in Table 1 under section I, while the respective optical values are again entered in Table 2 under section I.

According to another feature of the invention, it is also possible to mix the different kinds of glass of the above compositions at any desired ratios with each other, and it has been found that in such a case the optical values will extensively add to each other.

It has been further found that it is possible to increase the chemical stability of the different kinds of glass according to the invention without affecting their optical values by replacing an amount in boric acid of up to 10 mol percent by means of SiO₂ or P₂O₅.

Figure 4:
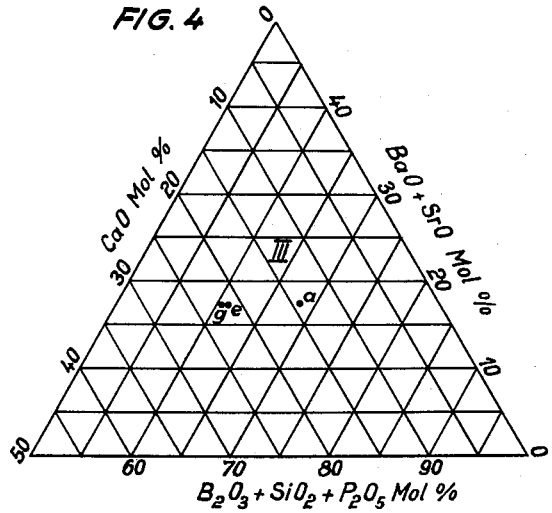

Different examples of such kinds of glass are indicated in the triangular coordinate system as shown in FIG. 4 and in Table 1 in section III, while the respective optical values are indicated in Table 2 in section III.

The oxygen contained in the glass according to the invention may be replaced by fluorine at a maximum extent of 2 percent by weight without any noticeable effect due to the volatility of the fluorine. Such replacement results in an increase in the Abbe value, which may also be attained by an addition of up to 1.5% by weight in Li₂O to the glass compositions according to the invention. A similar effect may be attained by an addition of up to 3% in BeO.

It is also regarded as being within the scope of the present invention to add a total amount of up to 5% by weight in La₂O₃, ZnO, and CdO, as well as up to 3% of other substances which are conventional in glass compositions, such as, for example, Al₂O₃, Ta₂O₅, or ZrO₂.

Like any other glass with a high content in boric acid, the new kinds of glass according to the invention also have an anomalous particle dispersion through which the blue end of the spectrum appears to be shortened.

Since the molten glass according to the invention is very thinly liquid and highly aggressive upon ceramic materials, the melting operation is preferably carried out in a platinum crucible. For refining the glass, temperatures of no more than 1400° C. are required. The processes of casting the molten glass and of subsequently cooling it may be carried out in the conventional manner.

Although our invention has been illustrated and described with reference to the preferred embodiments thereof, we wish to have it understood that it is in no way limited to the details of such embodiments, but is capable of numerous modifications within the scope of the apppended claims.

Having thus fully disclosed our invention, what we claim is:

1. An optical glass composition having a refractory index of from 1.59 to 1.65 and an Abbe value $\nu$ of $>62.2-(n_d-1.60).100$, consisting of the system BaO, CaO and B₂O₃ in a composition ratio in weight-percent, the range of which within a triangular coordinate system is defined by a straight-lined connection between the values A, B, C, D and E, wherein A is B₂O₃=47.73, BaO=52.73
B is B₂O₃=59.49, BaO=12.41, CaO=28.09
C is B₂O₃=71.84, BaO=12.08, CaO=16.08
D is B₂O₃=64.97, BaO=31.40, CaO=3.63, and
E is B₂O₃=59.54, BaO=40.46.

2. An optical glass having a refractory index of from 1.59 to 1.65 and an Abbe value $v$ of $$>62.2-(nd-1.60).100$$

consisting of the system SrO, CaO and $B_2O_3$ in a composition ratio in weight-percent, the range of which within a triangular coordinate system is defined by a straight-lined connection between the values A, B, C, D and E, wherein A is $B_2O_3=50.20$, SrO=49.80
B is $B_2O_3=61.00$, SrO=13.62, CaO=25.38
C is $B_2O_3=74.90$, SrO=13.20, CaO=11.90
D is $B_2O_3=71.74$, SrO=21.42, CaO=6.80, and
E is $B_2O_3=60.65$, SrO=39.35.

3. Optical glass as defined in claim 1, wherein up to a total amount of 10 weight-percent in boric acid is replaced by at least one member selected from the group consisting of $SiO_2$ and $P_2O_5$.

4. An optical glass composition having a refractory index $nd$ of from 1.59 to 1.65 and an Abbe value $v$ of $>62.2-(nd-1.60).100$, consisting of a mixture of glasses coming within the system BaO, CaO and $B_2O_3$ in a composition ratio in weight-percent, the range of which within a triangular coordinate is defined by a straight-lined connection between the values A, B, C, D and E, wherein A is $B_2O_3=47.73$, BaO=52.73
B is $B_2O_3=59.49$, BaO=12.41, CaO=28.09
C is $B_2O_3=71.84$, BaO=12.08, CaO=16.08
D is $B_2O_3=64.97$, BaO=31.40, CaO=3.63, and
E is $B_2O_3=59.54$, BaO=40.46.

5. An optical glass composition having a refractory index $nd$ of from 1.59 to 1.65 and an Abbe value $v$ of $>62.2-(nd-1.60).100$, consisting of a mixture of glasses coming within the system SrO, CaO and $B_2O_3$ in a composition ratio in weight-percent, the range of which within a triangular coordinate system is defined by a straight-lined connection between the values A, B, C, D and E, wherein A is $B_2O_3=50.20$, SrO=49.80
B is $B_2O_3=61.00$, SrO=13.62, CaO=25.38
C is $B_2O_3=74.90$, SrO=13.20, CaO=11.90
D is $B_2O_3=71.74$, SrO=21.42, CaO=6.80, and
E is $B_2O_3=60.65$, SrO=39.35.

6. An optical glass as defined in claim 2, wherein up to a total amount of 10 weight-percent in boric acid is replaced by at least one member selected from the group consisting of $SiO_2$ and $P_2O_5$.

7. An optical glass composition consisting essentially of an oxide content of basic glass in weight-percent as follows:

$$B_2O_3=54.19$$
$$CaO=12.97$$
$$BaO=32.84$$

8. Optical glass as defined in claim 1, having an addition of up to 1.5% by weight in $Li_2O$.

9. Optical glass as defined in claim 1, having an addition of up to 3% by weight in BeO.

10. Optical glass as defined in claim 2, having an addition of up to 1.5% by weight in $Li_2O$.

11. Optical glass as defined in claim 2 having an addition of up to 3% by weight in BeO.

References Cited in the file of this patent

UNITED STATES PATENTS

| | | |
|---|---|---|
| 1,570,876 | Compton | Jan. 26, 1926 |
| 2,090,098 | Berger et al. | Aug. 17, 1937 |
| 2,294,844 | Gelstharp | Sept. 1, 1942 |
| 2,434,146 | De Paolis | Jan. 6, 1948 |
| 2,466,392 | De Paolis | Apr. 5, 1949 |
| 2,517,459 | Armistead | Aug. 1, 1950 |
| 2,584,974 | Armistead | Feb. 12, 1952 |
| 2,764,492 | Weissenberg et al. | Sept. 25, 1956 |

UNITED STATES PATENT OFFICE
CERTIFICATION OF CORRECTION

Patent No. 3,009,819            November 21, 1961

Walter Geffcken et al.

It is hereby certified that error appears in the above numbered patent requiring correction and that the said Letters Patent should read as corrected below.

In the drawings, sheet 2 thereof, lower left corner, name of inventor, for "WALTER GEFFKEN" read -- WALTER GEFFCKEN --; column 3, in TABLE 2, column 3 thereof, line 7, for "62.6" read -- 63.6 --; column 4, line 23, for "hteir" read -- their --.

Signed and sealed this 17th day of April 1962.

(SEAL)
Attest:

ESTON G. JOHNSON
Attesting Officer

DAVID L. LADD
Commissioner of Patents